United States Patent [19]

Baldwin et al.

[11] 4,016,894
[45] Apr. 12, 1977

[54] DRAG REDUCING COMPOSITION AND METHOD

[75] Inventors: Bruce B. Baldwin, East Grand Rapids; Robert N. Hammer, East Lansing, both of Mich.

[73] Assignee: Belknap Corporation, Grand Rapids, Mich.

[22] Filed: Aug. 28, 1975

[21] Appl. No.: 608,766

[52] U.S. Cl. .................................. 137/13; 252/384
[51] Int. Cl.² .......................................... F17D 1/16
[58] Field of Search .......... 137/13; 252/8.5 C, 383, 252/384

[56] References Cited
UNITED STATES PATENTS

| | | | |
|---|---|---|---|
| 3,730,275 | 5/1973 | McClaflin | 137/13 X |
| 3,884,252 | 5/1975 | Kruka | 137/13 |

*Primary Examiner*—Alan Cohan
*Attorney, Agent, or Firm*—McGarry & Waters

[57] ABSTRACT

Drag in turbulent aqueous streams is reduced by a powder composition of a finely divided hygroscopic drag reducing powder, for example poly(ethylene oxide), and a colloidal size hydrophobic powder, for example, an organosilicon modified colloidal silica, and an inert filler such as sodium sulphate. The powder composition is injected into the turbulent stream by first mixing the powder with water to form a slurry and immediately thereafter drawing the slurry through an eductor into a recycle stream between the downstream and upstream ends of a pump for the turbulent stream.

11 Claims, 1 Drawing Figure

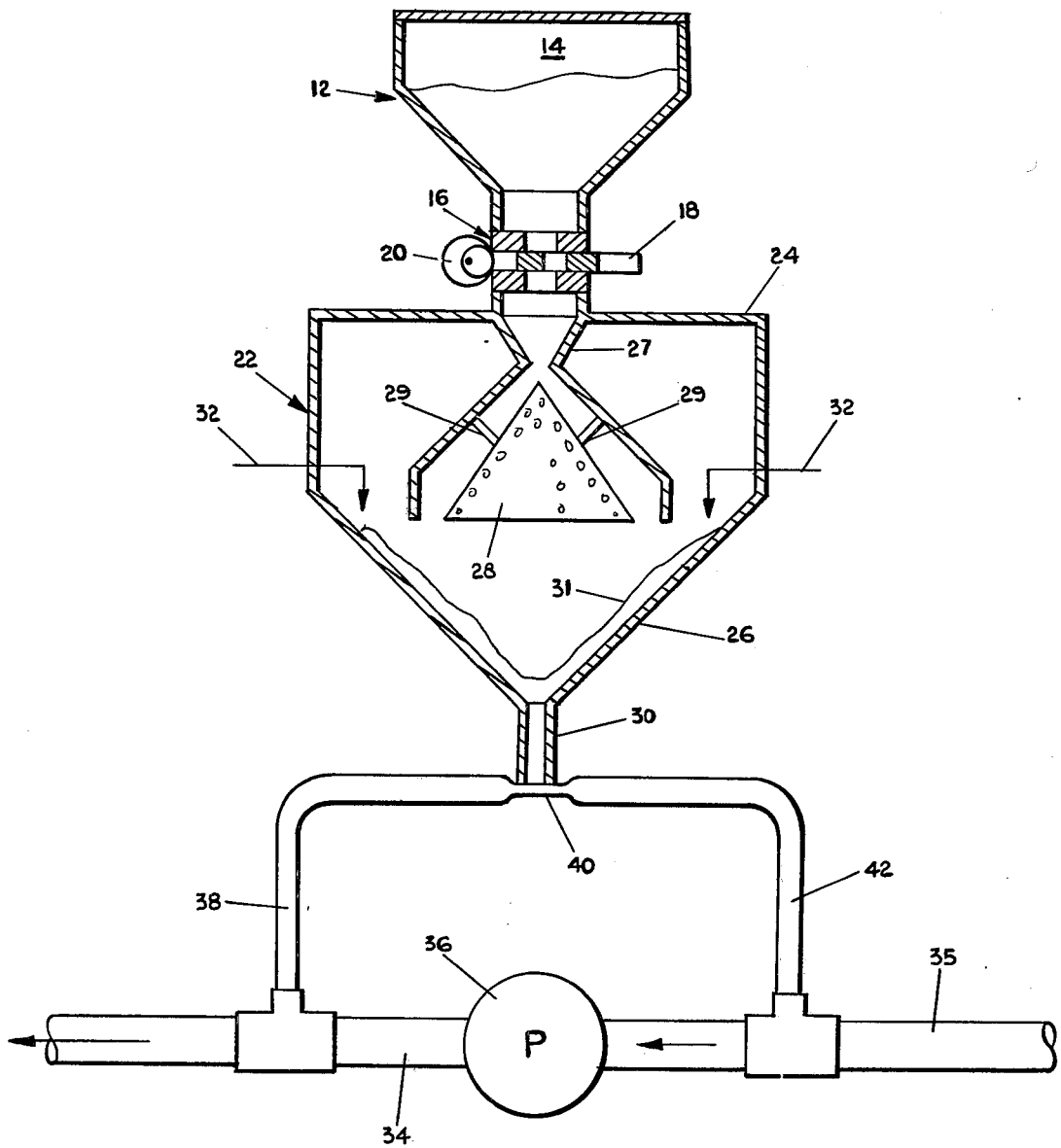

DRAG REDUCING COMPOSITION AND METHOD

BACKGROUND OF THE INVENTION

1. Field of the Invention

This invention relates to friction reduction for turbulent high pressure water streams for use, for example, in firefighting applications. In one of its aspects, the invention relates to a novel composition which can be added to a turbulent stream of water at the point of use. In another of its aspects, the invention relates to a method for reducing drag in high pressure water streams.

2. State of the Prior Art

The term "drag reduction," as it is known in the fluid flow art, is the increase in volumetric flow rate of a fluid at given pressure drop due to the addition (usually of a small amount, e.g., 200 ppm or less) of a solid, linear polymeric material of relatively high molecular weight. Such material is known as the "drag reducing agent." The term "hydrodynamic drag reducing efficiency" is a measure of the percent increase in the flow rate of treated water (which contains the hydrodynamic drag reducing agent) relative to the flow rate of untreated water (lacking the hydrodynamic drag reducing agent).

In the past few years considerable effort has been expended in attempts to devise methods for introducing drag-reducing polymers into aqueous streams. For example, concentrated aqueous solutions of the drag reducing agent can be injected into the water stream to be treated. The drag-reducing polymer has its highest "hydrodynamic drag reducing efficiency" at concentrations of from 50 ppm to 200 ppm. It is convenient to make up a concentrated solution containing the 1 percent or more of the drag reducing polymer and to inject this solution into the aqueous stream to be treated at a rate sufficient to yield the optimum concentration in the treated stream. However, this procedure has shortcomings. Poly(ethylene oxide) of molecular weight 4,000,000 is very efficient drag-reducing polymer but, because of its high molecular weight, concentrated solutions are extremely viscous. Dissolution is also very difficult. The poly(ethylene oxide) particles tend to stick together and form agglomerates during the dissolution process. Solutions higher in concentration than one percent are difficult to pump with conventional equipment. Furthermore, the viscous concentrate does not mix readily with the aqueous stream to be treated. Also aqueous solutions of poly(ethylene oxide) degrade on storage and their hydrodynamic drag reducing efficiency is lost.

Another approach is the use of slurries of drag reducing polymer in an organic solvent which is a non-solvent for the drag reducing polymer. For example, a slurry of a finely divided poly(ethylene oxide) can be prepared in a water-soluble carrier fluid such as propylene glycol. This slurry is injected into the aqueous stream to be treated. The particulate polymer particles dissolve in the water and impart the desired drag reducing effect. Slurries can contain 30 percent by weight or more of poly(ethylene oxide). Consequently, slurries require smaller storage containers for the amount of polymer required to treat a given volume of water than do aqueous stock solutions, where the maximum concentration which can be effectively utilized is one percent or less.

The slurry system of introducing poly(ethylene oxide) into aqueous streams has been developed for use in fire fighting applications. The slurry can be dispensed from a container holding about 20 gallons carried on the fire truck. It is injected by mechanical pumping into the water at the suction side of the water impeller pump.

In the various techniques discussed above, the methods employed for introducing the drag reducing agents into the aqueous streams generally utilize an apparatus which was adapted to store and "inject" proportionate amounts of the vehicle containing the drag reducing agent into the flowing aqueous stream. The conventional apparatus is complex in nature and usually includes the necessary valves, pumps, storage containers, electrical systems and injection devices which create problems due to the tendency of the drag reducing agent to agglomerate in the system. Moreover, breakdowns occur due to normal mechanical failure in the system. Further, the cost of the slurry and the equipment is high.

Another method of introducing poly(ethylene oxide) into an aqueous stream utilizes a tablet consisting of a physical mixture of poly(ethylene oxide) and a water-soluble organic or inorganic material, both ingredients being in finely divided powdered form. The mixture is compressed into the tablets, preferably in the form of cylinders about one-half inch high and about one-half inch in diameter. Tablets of this type are placed in a canister and the canister, in turn, is inserted into the stream to be treated. Water flowing through the interstitial spaces between tablets causes them to dissolve. With the tablet form, however, it has been difficult to achieve the optimum concentration of the polymer in a high pressure water stream. Further, the results are irregular and blockage takes place in the delivery systems. It is quite difficult to accurately meter the desired concentrations into the water systems.

Water soluble polymers other than poly(ethylene oxide) are also effective drag reducing agents when dissolved at low concentrations in aqueous streams. Polymers known to be effective are polyacrylamide, certain cellulose derivatives such as hydroxyethyl cellulose or methoxy cellulose, and certain polymers derived from natural products, e.g., guar gum or akra bean extract. In general the problems associated with practical use of these polymers are similar to those encountered with poly(ethylene oxide). In order to be an effective drag reducing agent, a polymer must be very high in molecular weight. Therefore aqueous stock solutions of concentrations high enough to be usable for injection into the aqueous stream to be treated are very viscous and difficult to pump.

SUMMARY OF THE INVENTION

According to the invention, there is provided a method for reducing drag in a turbulent water stream by adding thereto a mixture of a finely divided free flowing hygroscopic drag reducing powder and a colloidal size hydrophobic powder. The hydrophobic powder is of a size and present in amounts sufficient to inhibit caking of the hygroscopic powder under normal dry storage conditions, to promote free flow of the dry hygroscopic powder and to enhance dissolution of the hygroscopic powder in water. Preferably, the mixture is first mixed with water to form a slurry before injecting the water into the turbulent water stream. Contrary to expectations, the hydrophobic powder synergistically aids in the dissolution process by keeping the hygroscopic particles separated through the dissolution process.

Also, according to the invention, there is provided a novel composition for reducing drag in turbulent water streams. The composition comprises a free flowing hygroscopic drag reducing powder and a hydrophobic powder which is of a particle size and present in amounts sufficient to inhibit caking, to promote free flow and to enhance dissolution of the hygroscopic powder in water.

DETAILED DESCRIPTION OF THE INVENTION

The hygroscopic drag reducing powder is relatively small in particle diameter to enhance dissolution into the turbulent water stream. Generally, the particle size is in the range from 100 to 1,500 microns and, in a preferred embodiment, is of a size so that 98% thereof will pass through a 20-mesh screen.

Many different hygroscopic drag reducing powders can be used. Well known hygroscopic drag reducing powders include:

poly(ethylene oxide)
polyacrylamide
guar gum
karaya gums
xanthan gum
sodium carboxy ethyl cellulose methyl cellulose
natural gums
carboxy vinyl polymers with polyacrilamides
carboxymethyl cellulose
hydroxy ethyl cellulose sodium silicate or a silicate salt of a polyvalent metal, such as calcium, magnesium, iron or aluminum polyvalent salts of acrylic acid, such as calcium or magnesium acrylate sodium salts of acrylic emulsion The preferred hygroscopic powders are poly(ethylene oxide) having a molecular weight in the range of 2 to 12 million, preferably about 4 million, and polyacryl amides having a molecular weight in the range of 2 to 10 million. An example of a poly(ethylene oxide) is POLYOX WSR-301 sold by the Union Carbide Company.

The hydrophobic powder is generally smaller than the hygroscopic powder so it can coat the hygroscopic powder or act as a lubricant therefor. The hydrophobic powders function in the mixture to resist agglomeration or caking of the hygroscopic powder. Further, the hygroscopic powders, when coated with hydrophobic powder, vigorously repel atmospheric moisture in storage and thus have enhanced shelf life and improved resistance to hydration, hydrolysis and other water induced degradation processes. Thus, the hydrophobic powder improves shelf life, prohibits caking before and during the dissolution process and provides free flow of the powder. Further, and unexpectedly, the hydrophobic powders enhance the dispersion capabilities of the hygroscopic powders in water. Because the hygroscopic particles are coated with the hydrophobic particles, they repel each other and are thus easily wetted by the water during the dissolution process. Agitation or turbulation during the mixing process serves to dislodge the coating of the hydrophobic powder from the hygroscopic powder so that the hygroscopic powder is effectively dissolved in water. The dissolution process can take place directly in the turbulent flowing water stream or can take place with agitation prior to introduction into the turbulent water stream. Dispersion and/or dissolution takes place in an easily controlled process. After dissolution of the hygroscopic agent in water, the hydrophobic agent rises to the surface as a waste product.

The amount of the hydrophobic powder generally ranges from 0.01 to 20 parts by weight per 100 parts by weight of the hygroscopic powder. Preferably about 0.5 to 3.5 weight parts of the hydrophobic powder is present in the mixture. Desirably one part of the hydrophobic particles is present per 100 parts by weight of the hygroscopic powder.

The hydrophobic powders which can be used according to the invention are preferably nonporous particulate colloidal metal or metalloid oxide powders such as silica modified by a reaction with an organo-silicon compound. The organo-silicon compound with which the metal or metalloid oxide is treated is a silyl, silane or siloxane having 1 to 3 alkyl, aryl, alkaryl or aralkyl hydrocarbon groups having 1 to 8 carbon atoms per group and having 0–3 halogen atoms per group. Examples of such hydrophobic agents are:

trimethylsilyl modified fumed silicon dioxide
Trimethylsiloxy modified fumed silicon dioxide
trimethylsiloxyl modified fumed silicon dioxide
dimethyldichlorosilane modified silicon dioxide
dimethyldichlorosilane modified fumed silicon dioxide A preferred hydrophobic powder is trimethylsilyl modified fumed silicon dioxide having a particle size of about 7 millimicrons. An example of such a compound is SILANOX, sold by the Cabot Corporation. Another preferred powder is a dimethyldichlorosilane modified silicon dioxide sold by DeGussa Company. A preferred group of hydrophobic agents is disclosed in the U.S. patent to Tully et al., 3,592,679, issued July 13, 1971, which patent is incorporated hereby by reference. The process for treating colloidal metal and metalloid oxides with organosilicon compounds is well known. Such processes are disclosed in one or more U.S. Pat. Nos. 2,520,661; 2,589,705; 2,705,206; and 2,705,222.

The composition of the invention including the hygroscopic powder and the hydrophobic powder can be mixed with a filler. Generally, the filler can comprise up to 50% by weight of the total drag reducing composition. Suitable fillers are particulate sodium sulfate and calcium sulfate.

Preferably, the powder mixture is metered into water to form a slurry and the slurry is thereafter drawn through an eductor into a flowing water line with which it is admixed with the turbulent water stream. The water with which the powder composition is initially mixed provides a vehicle for injecting the composition into the turbulent water stream. Normally, the hygroscopic agent does not significantly dissolve in the water before the slurry is injected immediately into the turbulent water stream where the bulk of the dissolution takes place. This immediate injection step avoids formation of viscous equipment-clogging solutions. If desirable, the mixture can first be dissolved in water and the water can then be injected into the turbulent water stream. However, since the turbulation of the water effectively dissolves the particle because of the presence of the hydrophobic powder, the separate dissolution step is believed unnecessary and undesirable.

BRIEF DESCRIPTION OF THE DRAWINGS

The invention will now be described with respect to the accompanying drawings which illustrate schematically an embodiment of the invention.

DESCRIPTION OF A PREFERRED EMBODIMENT

Referring now to the drawings, there is shown a powder hopper 12 in which the drag reducing powder composition 14 is placed. Desirably, the hopper has an outlet opening at the bottom and is enclosed with a removable cover at the top. A vibrator 20 is provided on the valve 16 to assist in the flow of the powder therethrough. A metering valve 16 having a slidable valve plate 18 is positioned in the hopper outlet to meter the powder therefrom.

A slurry forming device 22 is connected to the hopper discharge opening at the metering valve 16 and has a cover 24 joined to a conical funnel 26 having a delivery tube 30. A collector funnel 27 is provided beneath the metering valve to collect the powder and to direct the powder to the apex of a dispersing cone 28. The dispersing cone 28 is supported by supports 29 which are connected to the collector funnel 27. The dispersing cone 28 disperses the powder from the valve 16 substantially equally around the conical funnel 26. The dispersing cone can be smooth or can have a series of serrations or grooves extending from the apex to the base thereof. Alternatively, the dispersing cone can have various geometric shapes such as round, hexagonal or octagonal polyhedral figures.

Water in the form of sprays is introduced at the top of the funnel 26 through water supply lines 32. The water can be delivered by a series of pipes 32 spaced about the periphery of the funnel 26 or can be dispersed with a single manifold pipe which extends around the top of the funnel 26. A single manifold pipe (not shown) would have a plurality of holes to distribute the water uniformly around the entire top surface of the funnel 26.

The water washes the powder down the sides of the funnel 26 and provides a vehicle for the powder. At this point, the powder is evenly dispersed as discrete particles to avoid agglomeration. Relatively little dissolution of the hygroscopic powder is believed to occur in the funnel. Thus, the powder forms a slurry 31 with the water spray from pipes 32. The slurry flows into the delivery tube 30.

A high pressure water line 34 has a pump 36 which pumps the water at high pressures and flow rates to, for example, a hose with a high pressure nozzle. A water withdrawal pipe 38 is provided at the downstream side of the pump 36 and is connected to an eductor 40. The delivery tube 30 is connected to the educator 40 so that water passing through the eductor draws the slurry 31 from the delivery tube 30. The slurry and water combined in the eductor 40 are returned to the water line 35 on the suction side of the pump 36 through line 42.

In operation, the drag reducing powder composition is first loaded into the powder hopper 12. The vibrator 20 vibrates the powder so that it flows evenly through the metering valve 16 when the valve plate 18 is open. The valve plate 18 is open to permit the powder to flow therethrough. The extent to which the valve plate 18 is open determines the amount of drag reducing powder which is added to the high pressure water line 34. As the powder falls through the valve 16, it strikes the apex of the dispersing cone 28 and is dispersed substantially uniformly around the entire cone. The powder slides down the sides of the cone and is deposited on the top of the funnel 26. Water injected from water supply pipes 32 uniformly flows down the inner surface of the funnel 26 to form a slurry with the powder 14. The powder and water slurry flows through the delivery tube 30 drawn by water passing through the educator 40.

The water pressure in line 38 is greater than that in line 42. Thus, the water flows through the eductor 40 at a rate dependent on the eductor size and the pressure differential between the pipes 38 and 40. In the case of a firefighting system, the pump 36 provides high pressure in line 38 so that the water flows rapidly through the eductor 40. As the drag reducing powder and water slurry enters the eductor 40, it is turbulated to begin to break down the hydrophobic characteristic of the coating on the powder particles. Upon entry of the mixture into the water line 34 and passage of the mixture through pump 36, considerable turbulation occurs to completely break down the hydrophobic characteristics and to dissolve the drag reducing composition in the water line. Thus, the powder is completely dissolved within the water line before or shortly after passing through pump 36. With the use of the system according to the invention, the powder can be dispersed quickly and easily in the water to reduce the drag.

EXAMPLE 1

About 1½ parts by weight of SILANOX 101 (trimethylsilyl modified fumed silicon dioxide having a particle size of about 0.007 microns sold by the Cabot Corporation) was mixed in dry powder form with about 98½ parts by weight of POLYPOX WSR-301 [a poly(ethylene oxide) sold by the Union Carbide Corporation, having a molecular weight of about 4 million and a particle size less than about 250 microns]. The dry mixture was metered in a process and apparatus described above with respect to the drawing into a conical funnel which was supplied with enough water to form a slurry with the powder composition. A mixture was metered so that 80 parts per million of the poly(ethylene oxide) would be present in a high pressure turbulent water stream having a hose length of 200 feet and a diameter of 1½ inches. A 1-inch diameter straight stream nozzle was provided at the end of the hose. The pump provided 54 pounds of pressure on the nozzle. Prior to the addition of the drag reducing composition, the water flowed through the nozzle at approximately 217 gallons per minute. After the addition of the drag reducing composition as described above, the nozzle pressure was 94 pounds and the water flowed through the nozzle at about 289 gallons per minute, a 33 percent hydrodynamic drag reducing efficiency. With such drag reducing efficiencies, water streams can be projected considerably farther.

EXAMPLE 2

The process of Example 1 was repeated using SEPARAN AP 273, a polyacryl amide sold by Dow Chemical Co., in lieu of the POLYOX WSR-301. Similar results were obtained except that drag reduction efficiency was somewhat less due to the lower drag reducing effectiveness of the polyacryl amide.

EXAMPLE 3

The process of Example 1 was repeated using a dimethyldichlorosilane modified fumed silicon dioxide. Similar drag reducing efficiencies were obtained.

The invention thus provides a novel and inexpensive way of reducing drag in high pressure turbulent water lines. The drag is reduced effectively by the powder composition with simple equipment. The drag reducing powder is itself inexpensive when compared with organic slurries and tablets and requires considerably less sophisticated equipment for injection into the flowing water stream. The slurry injection method avoids gel formation and build-up in equipment. Further, the composition in dry powder form is light in weight compared with the organic slurries and thus is easier and less expensive to ship. Still further, the powder composition is not subject to degradation over time. Shelf lives of 1 year have already been experienced without any significant degradation. In addition, the powder composition is free flowing and easy to meter in accurate amounts.

Whereas the invention has been described with reference to a particular slurry injection system, other means for injecting the powder into the water stream can be employed. For example, direct addition to the water stream with or without blowing with air can be employed.

Reasonable variation and modification are possible within the scope of the foregoing disclosure and drawings without departing from the spirit of the invention.

The embodiments of the invention in which an exclusive property or privilege is claimed are defined as follows:

1. A process for reducing hydrodynamic drag of a turbulent aqueous stream comprising the step of injecting into the turbulent aqueous stream a mixture of a finely divided free flowing hygroscopic drag reducing powder, which tends to agglomerate when dissolved in water, and a colloidal size moisture repelling hydrophobic powder, the hydrophobic powder coating the hygroscopic powder and being of such size and being present in the mixture in amounts sufficient to effectively inhibit the caking of the hygroscopic powder under normal storage conditions, to promote free flow of the hygroscopic powder and to control the rate at which the hygroscopic powder dissolves in the aqueous water stream so as to minimize agglomeration of the hygroscopic powder during dissolution thereof.

2. A process for reducing hydrodynamic drag according to claim 1 wherein the mixture is first mixed with water to form a slurry before injecting the water into the turbulent water stream, and the slurry is injected into the water stream prior to appreciable dissolution of the hygroscopic powder.

3. A process for reducing hydrodynamic drag according to claim 2 wherein about 0.1 to 20 parts by weight of the hydrophobic powder per 100 parts by weight of the hygroscopic powder are present in the mixture.

4. A process for reducing hydrodynamic drag according to claim 3 wherein the hygroscopic drag reducing powder has a particle size in the range of 100 to 1,500 microns.

5. A process for reducing hydrodynamic drag according to claim 1 wherein the hygroscopic drag reducing powder is at least one of poly(ethylene oxide), polyacryl amide, guar gum, karaya gum, xanthan, gum, methyl carboxy ethyl cellulose, carboxy methyl cellulose, hydroxy ethyl cellulose, carboxy vinyl polymers mixed with polyacryl amides and natural gums.

6. A process for reducing hydrodynamic drag according to claim 1 wherein the hygroscopic powder is poly(ethylene oxide).

7. A process for reducing hydrodynamic drag according to claim 1 wherein the hygroscopic powder is polyacryl amide.

8. A process for reducing hydrodynamic drag according to claim 1 wherein the hydrophobic powder has a particle size in the range of 0.001 to 100 microns.

9. A process for reducing hydrodynamic drag according to claim 8 wherein said hydrophobic powder is a substance formed by the reaction of a generally nonporous particulate colloidal metal or metalloid oxide with an organo-silicon compound.

10. A process for reducing hydrodynamic drag of a turbulent aqueous stream comprising the steps of metering into a flowing film of water to form a slurry, a mixture of a finely divided free-flowing hygroscopic drag reducing powder, which tends to agglomerate when dissolved in water, and a colloidal moisture repelling hydrophobic powder, the hydrophobic powder being of such size and being present in the mixture in amounts sufficient to effectively inhibit the caking of the hygroscopic powder under normal storage conditions, to promote free flow of the hygroscopic powder and to control the rate at which the hygroscopic powder dissolves in water so as to minimize agglomeration of the hygroscopic powder during dissolution, and injecting the slurry thus formed into a turbulent aqueous stream.

11. A process for reducing hydrodynamic drag according to claim 10 wherein the hygroscopic drag reducing powder is poly(ethylene oxide) having a particle size in the range of 100 to 1,500 microns and having a molecular weight in the range of 2 to 12 million and the hydrophobic powder is a colloidal organo-silicon powder having a particle size in the range of 0.001 to 100 microns, the organo-silicon powder being a methylsilyl modified fumed silicon dioxide, and wherein 0.5 to 3.5 parts by weight of hydrophobic powder per 100 parts by weight of the poly(ethylene oxide) particles are present in the dry mixture.

* * * * *